Oct. 28, 1924.
J. W. STOLLE
1,513,350
MEANS FOR AND METHOD OF DRILLING DEEP HOLES IN WOOD
Filed Feb. 23, 1924
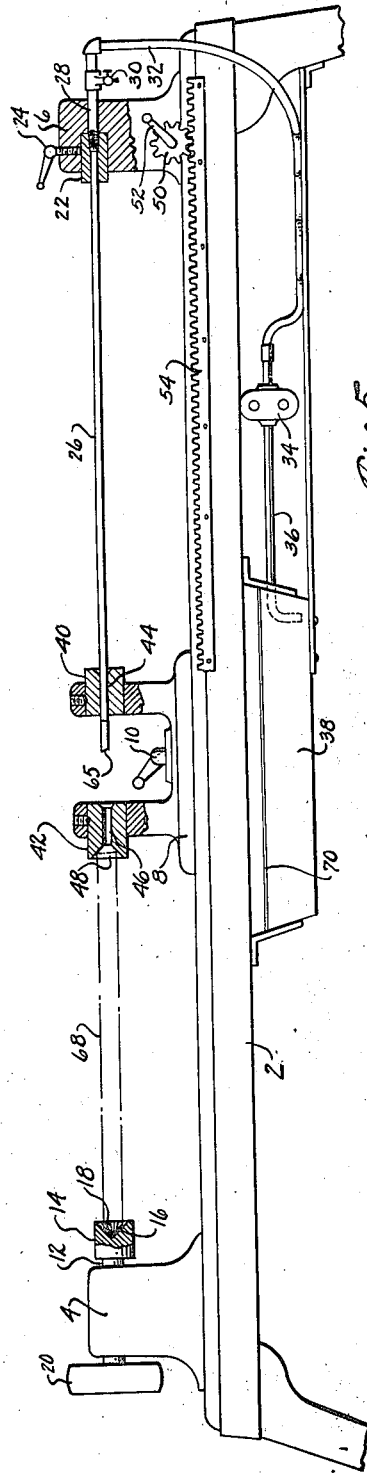
John W. Stolle
INVENTOR
Bartlett Brownell
ATTORNEYS Patented Oct. 28, 1924.

1,513,350

UNITED STATES PATENT OFFICE.

JOHN WILLIAM STOLLE, OF DANBURY, CONNECTICUT, ASSIGNOR TO THE DANBURY UNBREAKABLE TOOL CORPORATION, OF DANBURY, CONNECTICUT, A CORPORATION OF CONNECTICUT.

MEANS FOR AND METHOD OF DRILLING DEEP HOLES IN WOOD.

Application filed February 23, 1924. Serial No. 694,521.

*To all whom it may concern:*

Be it known that I, JOHN WILLIAM STOLLE, a citizen of the United States, residing at Danbury, county of Fairfield, State of Connecticut, have invented a certain new and useful Means for and Methods of Drilling Deep Holes in Wood, of which the following is a full, clear, and exact description.

My invention relates to the drilling of straight deep holes in wood by means of a long and relatively slender drill, the point of the drill and the resulting hole being of comparatively small diameter and so long that the drill, on account of its length and diameter, is liable to be flexed. My invention has for its object to provide an efficient means for and method of drilling such holes approximately parallel to the grain of the wood.

As is well known, the grain of wood is not perfectly straight and a straight hole can, therefore, only approximate parallelism with the grain. I believe that heretofore no satisfactory means or method has ever existed for accomplishing my object and that where deep straight holes of comparatively small diameter, such for instance as approximately one-half inch or less, or even larger and of a length requiring a flexible drill, have been produced, a perfect drilling has only been accomplished by chance and that about 50 per cent of the attempts to drill such holes have been failures. Such failures result in a great loss in time, labor and material, so that it has been considered practically impossible to drill such holes in commercial manufacture, although the drilling of such holes has long been known to be highly desirable for the manufacture of various articles, such for instance as bobbins or spools and the like. I have found that in many other relations such holes are highly desirable such as in the forming of reinforced peavey handles, hammer handles, whiffle-trees and the like, and by my means and method I have succeeded in drilling such deep holes with practically no failures and at a very rapid rate so as to save both time, labor and material. In drilling holes according to my invention, I find that a machine which is substantially the same as the well known rifle-bore drilling machines, manufactured by Pratt & Whitney of Hartford, Connecticut, and by the Baush Machine Tool Company of Springfield, Massachusetts, is admirably suited for my purpose, when a special drill of my invention and hereinafter described is employed. This drill to the ordinary observer differs little from the drill used for drilling rifle barrels, but the difference hereinafter pointed out as essential, while physically small, is operatively great and is of tremendous importance as upon the presence or absence of the same depends the success or failure of the operation.

The following is a description of means for and method of carrying out my invention, reference being had to the accompanying drawing which shows in simplified diagrammatic form a rifle drilling machine referred to with my new drill and capable of carrying out my method, in which, Figure 1 shows a side elevation of the machine partly in section;

Fig. 2 shows a side elevation of the drill bit;

Fig. 3 shows an end view of the cutting end of the drill;

Fig. 4 shows an end view of the other end of the bit;

Fig. 5 shows a longitudinal section extending through the tube but not through the bit;

Fig. 6 shows a transverse section of the tube on the line 6—6, Fig. 5;

Fig. 7 shows an enlarged end view of the preferred form of bit with its undercut reaming edge; and Fig. 8 shows a side elevation of the end of the same.

Fig. 9 is a much enlarged perspective view of the end portion of the drill.

Referring more particularly to the drawings, 2 is the bed of the machine having at one end a head-stock 4 and having slidingly mounted thereon a tail-stock 6 between which is a guide carriage 8 adapted to slide upon the bed 2 and to be clamped in any desired position by the clamp 10. The head-stock is provided with a shaft 12 carrying a chuck 14 rigidly secured thereto and having a conical recess 16 on its forward end provided with projections 18 which serve to bite into one end of the piece of wood to be bored, the shaft 12 and chuck 14 being rotatable at a high speed by the pulley 20. The tail-stock 6 is provided with a recess into which the butt 22 of the drill is secured by a set screw 24. This butt 22 has a longitudinal bore in which is rigidly secured the tube 26 constituting the shank of the drill. To the other end of the bore in the butt 22 is connected a pipe 28 provided with a petcock 30. To the end of the pipe 28 is connected a flexible hose 32 which leads to the discharge of an ordinary gear pump 34, the suction opening of which is connected to a pipe 36 which leads to a tank 38 beneath the guide support 8. The gear pump 34 as is well known, will supply liquid under high pressure, and I preferably use a pressure of between 350 and 700 pounds.

The guide carriage 8 is provided with two guides 40 and 42 having bores 44 and 46 which closely fit the cutting end of the drill and are in exact alinement with the axis of the hole to be drilled. The guide 42 has at its rear face a conical recess 48 whose axis is in line with the bores 44 and 46 with which bores the axes of the recess 16 and shaft 12 are also in exact alinement.

The tail-stock 6 is provided with some means for moving it longitudinally upon the bed of the machine at a rapid rate, such for instance as a gear wheel 50 provided with a handle 52 the gear wheel 50 meshing with a rack 54 carried by the bed of the machine, such means being sufficient where manual instead of power driven feeding means is employed.

The apparatus thus far described represents diagrammaticaly the rifle bore drilling machines heretofore referred to with the exception that in those drilling machines the guide 42 is provided with a cylindrical recess instead of a conical recess, such as the recess 48, and they are provided with slow feeding means only, their drilling speed being about six inches per minute.

In the rifle drilling machines, the tube 26 is brazed to a channeled drilling bit, the sides of which bit taper very slightly from its forward end toward its rearward end, which bit is admirably adapted for drilling deep holes in metal, such as steel, the drill bit being perforated longitudinally as at 55 so that a lubricating fluid may be drawn from the tank 38 by the pump 34 and forced through the drill so as to lubricate the drill and discharge the cuttings produced thereby through a channel such as 56 in its side. This machine with the usual tapered drill bit will not, however, satisfactorily drill straight deep holes in wood approximately in line with the grain of the wood. The wood as the drilling proceeds acts unequally upon the forward portion of the drill so as to deflect it to one side, causing the drill to bind so as to produce faulty operation and result in an imperfect product. I believe that one reason for this is that after the cutting face of the drill cuts away the wood, the wood contracts so as to soon bind the drill and to deflect its cutting end so as to produce a crooked hole. By my invention, I prevent this binding with the result that the forward end of the drill as it penetrates the wood moves in a rectilineal direction. I accomplish these remarkable results by providing the drill with a sharp reaming portion upon the forward edge of the channel, adjacent to the drilling end, thereby causing the drill to shave the walls of the hole being formed. Since the edge of the channel is substantially parallel with the axis of the bit the active portions of the cutting edge throughout its length are substantially equidistant from that axis. The shaving edge is preferably substantially parallel to, as well as equidistant from the axis of the bit.

Figs. 7 and 8 show, on an enlarged scale, my preferred form in which this reaming portion is on an edge lying in a cylindrical surface 58 concentric with the axis of the bit so as to be strictly equidistant from that axis even if not parallel thereto. Where a lengthwise portion only of the surface of the drill bit is cylindrical or parallel to the axis and the remainder 59 is tapered so as to be of such reduced diameter as to reduce the friction, the angle between the tapered portion and the untapered portion may be so slight as to be scarcely discernible to the eye. The presence of the strictly cylindrical surface 58 adjacent to the cutting end of the drill, while desirable, in my opinion is not essential. The sharp shaving portion, however, is essential.

The bit as heretofore, is provided with a groove or channel 56 in its side which extends the full length of the bit leaving an uninterrupted continuous surface of about 260°, and connects with a groove or channel 60 formed in the side of the connecting tubular shank to which the bit is brazed or swaged. The bit itself is provided with a longitudinal hole 55 which opens back of the cutting edge on the face of the bit and connects with the tubular shank so that liquid can be and is forced by the pump 34 through the tubular shank and drill head to the cutting face so as to moisten and soften the fibers being cut and shaved. The face of the drill bit is the same as that ordinarily used in the drill bits heretofore used with the rifle drilling machines mentioned when used for drilling metal, the edges 61 and 63 being the cutting edges thereon, extending from the periphery to or through the axis of the drill bit adjacent to the discharge channel and making a salient angle whose apex is out of alinement with the axis of the drill, except that I prefer to slant the rear face 65 a trifle more than in the rifle drilling bits so as to provide a larger opening through which the fluid passing through the drill bit can discharge into the longitudinal passage. I preferably make the slant somewhat more than 25°, as shown in Fig. 2. The edge of the bit is beveled behind the edge 63 as shown at 67. The other side of the bit may be beveled as at 69.

62 indicates the reaming or shaving edge upon the forwardly moving edge of the groove 56 adjacent to the cutting face of the bit, as referred to above, preferably substantially parallel to or equidistant from the axis of the drill, which portion acts to cut the sides of the hole, cutting away any portion of the wood which is brought within its path by the contraction of the wood after the action of the cutting face. This shaving or reaming action prevents the binding of the drill which would otherwise take place.

The substantially cylindrical portion of the drill engaging this reamed portion helps to guide the head of the drill as it enters the wood and to maintain its movement in line with the axis of the relative rotation of the drill bit and wood during the progress of the drilling operation. By this drill, so long as the cutting edge 62 is maintained sharp, deep straight holes can be formed along desired axes that are substantially parallel with the grain of the wood with great certainty and with great speed, the result being recognized as extraordinary by those skilled in the art. With a three-eighths inch drill having a one-quarter inch shaving edge I have drilled, in hard wood, deep straight holes aggregating in length 400 feet without resharpening the drill and have obtained quite satisfactory results with even shorter shaving edges.

I sharpen the reaming portion so that it shaves the wall of the hole and maintains it in condition by grinding it from time to time with a revolving carborundum or crystalon cylinder. A revolving cylinder ⅜ inch in diameter is adapted for sharpening the edge upon a ⅜ inch drill bit, as indicated in dots at 64 in Fig. 7. This cylinder produces the undercut 66 at the cutting edge, as shown on an enlarged scale in Fig. 7, which undercut edge produces results much superior to those produced by a shaving edge which is not undercut, the undercut edge retaining its shaving sharpness for a longer time.

In operating the drilling machine with my improved drill, the piece of wood to be drilled, shown in dots at 68, is inserted between the chuck 14 and the bushing 42, the slide 48 being thereupon moved up and secured in position so as to securely clamp the piece of wood between them. The conical recesses 16 and 48 automatically cause the piece of wood, such as a peavey handle, to be properly alined. I then drive the shaft 12 so as to rotate the piece of wood at high speed, preferably from 1800 to 2500 revolutions per minute, and then move the tail-stock 6 by means of the rack and pinion so as to cause the drill bit to move through the guide bushing 42 and enter the piece of wood, meanwhile supplying moistening fluid, such as soapy water, through the drill by the pump 34 from the tank 38 which acts to soften the wood and also to lubricate and cool the drill and the wood. This fluid discharges through the cutting end of the drill and flows out through the V-shaped channel 56—60 in the drill bit and tubular shank, contacting with the end of the wood within the conical cavity 48 and lubricating and cooling that surface where it rubs upon the guiding bushing 42, discharging behind the guiding bushing 42 into the tank 38 located beneath. The tank 38 is preferably provided with a screen or screens 70 for catching the cuttings so as to keep them out of the soapy water which is again and again passed through the machine. The tail-stock 6 is shown in this instance for illustration as being operated manually instead of by an automatic feed, such manual means being suitable in some instances for my purpose, and capable of moving the tail-stock at a fairly rapid rate. I have found that by the means described I have been able to drill a hole twenty-four inches deep in ten seconds, which calls for a two foot movement of the tail-stock 6 in ten seconds. The rapid feed caused by the quick relative longitudinal movement of the drill and wood is of importance since it keeps the shaving edge of the bit more actively at work, under which conditions that edge maintains its cutting sharpness while cutting a greater length of bore. The pressure of the lubricating fluid, while it should be high, should not be so high as to cause a back pressure sufficient to overcome the action of the means for moving the tail-stock, and the petcock 30 provides a means for relieving the pressure without reducing the speed of the pump, if at any time the pressure is too high.

In drilling a long piece of wood, I find it desirable to drill the same one-half way from one end and then reverse it in the chuck and bushing and drill it the remainder of the distance from the other end. Since the chuck and bushing are self-centering and since the drill drills a straight hole, this can be done without difficulty and the two holes will meet with practically mathematical accuracy in the central portion of the stick. This result has, I believe, never before been accomplished except perhaps by chance.

In carrying out my method, I prefer to hold the drill against revolution and rotate the wood to be drilled. I also prefer to move the drill parallel to its axis while holding it against rotation and to rotate the wood while holding it against such axial movement, both of these features being common practice in gun drilling but probably not essential in all cases.

I prefer to use a high speed of rotation for the wood, speeding it up to such speed as is compatible with the material being worked. The faster the machine operates up to at least 2500 R. P. M. the more accurate is the result, the less heating is present, and the greater is the permissible speed of the drilling operation in which a speed of two feet in ten seconds for hard maple has been attained.

Moreover, the high relative rotary speed of the drill in the wood causes the reaming edge to make a sharp impact with the wood, producing a true cutting or shaving action, which can not be obtained for any considerable length of bore at a low speed. The higher the speed of impact the better the result of the reaming action. The bores of the guide bushings 40 and 42, particularly the bore 46, should fit the drill bit closely enough to prevent substantial vibration of its end portion as the drill is entering the wood. This insures starting the drill bit straight and in direct alinement with the axis of the conical recess 48. The axes of the shaft 12, conical recess 18, conical recess 48, bore 44, bore 46 and preferably the shank 26 of the drill should be in exact alinement.

As in the ordinary drill bits for the rifle drilling machine the heel of the cutting face must be back of the cutting point, and, as stated, I preferably form the drill so as to bring this heel further back than in the bits used for rifle drilling.

In carrying out my method I drill a deep hole approximately with the grain of the wood, by alining the axis of the drill bit with widely separated points in the wood, through which points it is desired to pass the drill so as to form a deep hole, and then cause the face of the drill to cut the wood along the line passing through said points and simultaneously ream or sheave the walls of the hole at a portion thereof adjacent to the inner end or extending along the lateral surface of the drill for a distance adjacent to the cutting face of the drill, thus acting to ream the same and prevent the binding of the drill by the contraction of the wood about the bore, holding the axis of the end portion of the drill bit in alinement with said points, and forcing the cuttings out through the hole being drilled by fluid, preferably soapy water forced through the drill under high pressure, which moistens the fibers being cut and reamed and cools the parts. In carrying out the method I move the wood and drill axially relatively to one another and preferably produce this relative movement by moving the drill axially at a rapid rate. I also produce a relative movement of rotation of wood and drill at a high rate of speed so as to cause the reaming portion of the drill to exert a heavy impact in its cutting action.

The active reaming edge as shown, is substantially equi-distant from the axis of the drill by substantially the radius of the hole to be formed and longer than the feed for each revolution so that it reams to an extent greater than the feed during each relative revolution of tool and wood.

While I have for purposes of illustration shown in the drawings a reaming edge upon the drill of a definite length, my invention is not limited to this dimension which may be decreased and also may be increased so long as a true reaming action is present. In order to get the proper guiding action for the drill I preferably make the portion of the surface which is substantially parallel to the axis of the drill extend around that axis about 260° although it may be greater, provided it does not close up the side passage 56 too much, or may be made smaller so long as it does not interfere with the guiding action. I also prefer to make the reaming edge 62 parallel to the axis of the drill as distinguished from curving it around that axis, such an edge being easier to form and to maintain in sharp condition.

In forming a wooden cylinder or other object having a surface of revolution with an axial hole, I first by turning, or by turning and sawing off any unturned ends, produce a wooden object having concentric surfaces of revolution upon its body portion and ends and then clamp it between the chuck and bushing of the machine described so that they act upon said concentric end surfaces and aline the axis of the turned object with the axis of the end portion of the drill. I then cause the drill, by my means and method above described, to drill a deep straight axial hole passing either wholly or partially through the wood, as desired. This results in producing from practically every piece of good wood used a turned object with a straight axial hole.

Heretofore the practice has commonly been to drill holes in unturned pieces of wood and then to turn only those pieces in which the holes were approximately straight and approximately axial, so as to produce on such previously drilled pieces surfaces of revolution concentric with said holes, discarding the others. This old practice not only resulted in a great waste on account of destructively imperfect drilling, but necessitated the use of larger pieces of wood for cylinders or other turned objects of given dimensions so as to allow for any substantial divergence of the axis of the hole from the axis of the unturned stick of wood and make it possible to form the surface of revolution about the axis of the previously formed hole of uncertain position or direction.

By my method of making axially drilled cylinders or other objects of revolution any stick which is sound and of just the dimensions necessary to enable it to be turned into a cylinder or turned object of other form of the desired dimensions can be in practically every instance formed into the desired object with a straight axial hole so that waste is, practically speaking, eliminated. By following my method the danger of loss of good material is practically confined to the preliminary turning operation.

As will be evident to those skilled in the art, my invention permits of various modifications without departing from the spirit thereof or the scope of the appended claims.

What I claim is:

1. The method of drilling a deep hole approximately with the grain in a piece of wood, which consists in alining the axis of the end porton of a drill with widely separated points in the wood, through which points it is desired to pass the drill so as to form a deep hole, causing the face of the drill to cut the wood along the line passing through said points and simultaneously cutting the side wall of the hole substantially equi-distant from the axis of the drill at a portion thereof adjacent the cutting face of the drill to an extent not less than the feed during each relative revolution of the drill and wood and so as to ream the same and prevent binding the drill by contraction of the bore.

2. The method of drilling a deep hole approximately with the grain in a piece of wood, which consists in alining the axis of the end portion of a drill with widely separated points in the wood, through which points it is desired to pass the drill so as to form a deep hole, causing a rapid relative movement between said wood and drill about the axis passing through said points, causing a relative movement of said drill and wood toward one another along said axis so that said drill cuts through the wood along the line passing through said points, simultaneously cutting the side wall of the hole being formed substantially equi-distant from the axis of the drill at a portion adjacent the cutting face of the drill to an extent greater than the feed during each relative revolution of drill and wood so as to ream the same, and discharging the cuttings out through the hole being drilled by a cooling fluid under pressure.

3. The method of drilling a deep hole approximately with the grain in a piece of wood, which consists in alining the axis of the end portion of a drill with widely separated points in the wood, through which points it is desired to pass the drill so as to form a deep hole, causing the face of the drill to cut the wood along the line passing through said points, simultaneously shaving the side wall of the hole substantially equidistant from the axis of the drill at a portion thereof adjacent the cutting face of the drill to an extent not less than the feed during each relative revolution of the drill and wood and so as to ream the same and prevent binding of the drill by contraction of the bore, moistening the fibers being cut and shaved and forcing the cuttings out through the hole being drilled by liquid supplied under pressure.

4. The method of drilling a deep hole approximately with the grain in a piece of wood, which consists in alining the axis of the end portion of a drill with widely separated points in the wood, through which points it is desired to pass the drill so as to form a deep hole, rotating the wood at high speed about the axis passing through said points and relatively to said drill, causing the face of the drill to cut the wood along said axis by rapidly moving the drill along said line, simultaneously shaving the side wall of the hole produced substantially equidistant from the axis of the drill, at a portion thereof adjacent the cutting face of the drill to an extent not less than the feed during each relative revolution of the drill and wood and so as to ream the same and prevent binding of the drill by contraction of the bore, and by a liquid under pressure moistening the fibers being cut and shaved and also forcing the cuttings out through the hole being drilled.

5. In the drilling of deep holes in wood, the improvement which consists in introducing into the hole being drilled a stream of liquid under pressure, and thereby moistening and softening the fibers being cut and forcing the cuttings on through said hole, and simultaneously cutting the side wall of the hole substantially parallel to the axis of the drill adjacent to its inner end to an extent not less than the feed during each relative revolution of the drill and wood so as to ream the same.

6. A deep hole wood drill having upon its end a cutting face and provided with a sharp cutting edge upon its side spaced away from the axis of the drill throughout its active length by substantially the radius of the hole to be formed and adapted to shave the wall of the hole formed by said cutting face, said drill having a discharge passage adjacent said edge and a supply passage for supplying fluid to the forward end of said drill.

7. A deep hole wood drill having upon its end a cutting face and provided with a sharp undercut cutting edge upon its side spaced away from the axis of the drill throughout its active length by substantially the radius of the hole to be formed and adapted to shave the wall of the hole formed by said cutting face, said drill having a discharge passage adjacent said edge and a supply passage for supplying fluid to the forward end of said drill.

8. A deep hole wood drill having upon its end a cutting face and provided with a guiding surface adjacent its forward end and a sharp cutting edge extending along the side thereof and throughout its active length substantially equidistant from the axis of said drill and adapted to shave the wall of the hole formed by said cutting face, said drill having a discharge passage extending lengthwise thereof adjacent to said edge and interrupting said surface and a passage for supplying fluid to the forward end of said drill.

9. A deep hole wood drill having upon its end a cutting face and having a substantially cylindrical guiding surface adjacent its forward end having a radius equal to the radius of the hole to be formed, and having a sharp cutting edge extending along the side thereof adapted to shave the wall of the hole formed by said cutting face, said edge being throughout its active length substantially equally spaced from the axis of the drill, said drill having a discharge passage adjacent said edge and a passage for supplying fluid to the forward end of said drill.

10. A deep hole wood drill having upon its end a cutting face and provided with a sharp cutting edge upon its side spaced away from the axis of the drill throughout its active length by substantially the radius of the hole to be formed and adapted to shave the wall of the hole formed by said cutting face, said drill having a discharge passage adjacent said edge and a supply passage for supplying fluid to the forward end of said drill, the cutting face having cutting edges adjacent said discharge passage and forming a salient angle whose apex is out of alinement with the axis of said drill.

11. A deep hole wood drill having upon its end a cutting face and having a substantially cylindrical guiding surface adjacent its forward end having a radius equal to the radius of the hole to be formed, and having a sharp cutting edge extending along the side thereof adapted to shave the wall of the hole formed by said cutting face, said edge being throughout its active length substantially equally spaced from the axis of the drill, said drill having a discharge passage adjacent said edge and a passage for supplying fluid to the forward end of said drill, the cutting face having cutting edges adjacent said discharge passage and forming a salient angle whose apex is out of alinement with the axis of said drill.

12. In a machine for drilling deep holes in wood comprising means for holding a piece of wood in alinement with a drill and producing a relative movement of rotation between the wood and drill and means for producing relative axial movement between said drill and wood, the improvement which consists in a drill having in combination a cutting face and a sharp cutting edge extending along its side adjacent to said cutting face, said cutting edge throughout its active length being spaced substantially equally from the axis of the drill and so as to ream the hole being formed, the length of the active portion of said cutting edge being not less than the amount of feed during each relative rotation of the wood and drill.

JOHN WILLIAM STOLLE.